Figure 3:
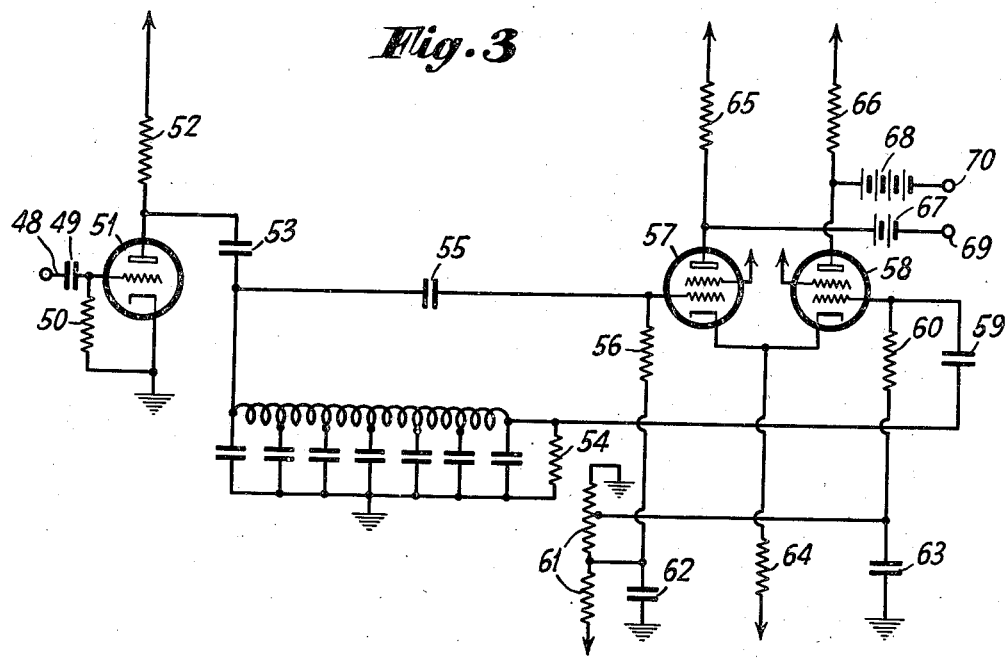

Jan. 5, 1943.   A. D. BLUMLEIN ET AL   2,307,375
TRANSMISSION OF ELECTRICAL SIGNALS HAVING A DIRECT CURRENT COMPONENT
Filed May 23, 1939   3 Sheets-Sheet 1
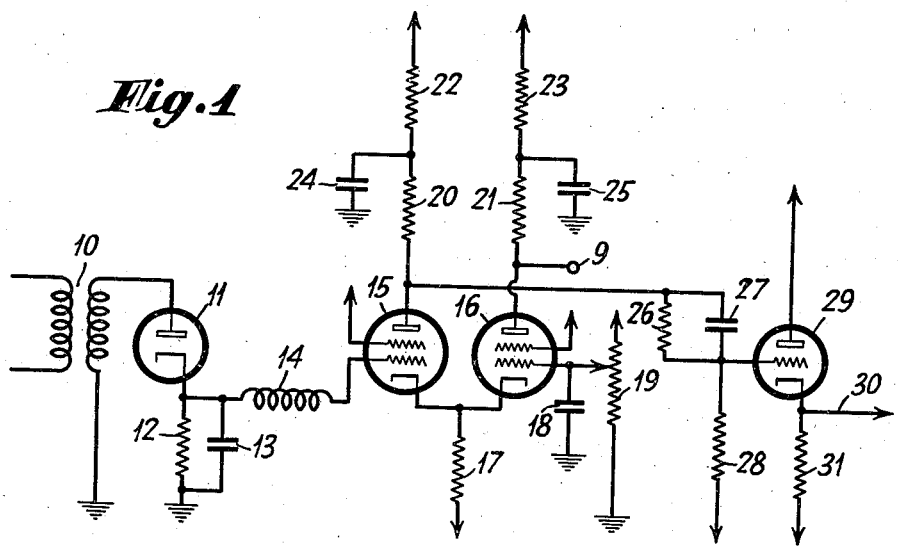
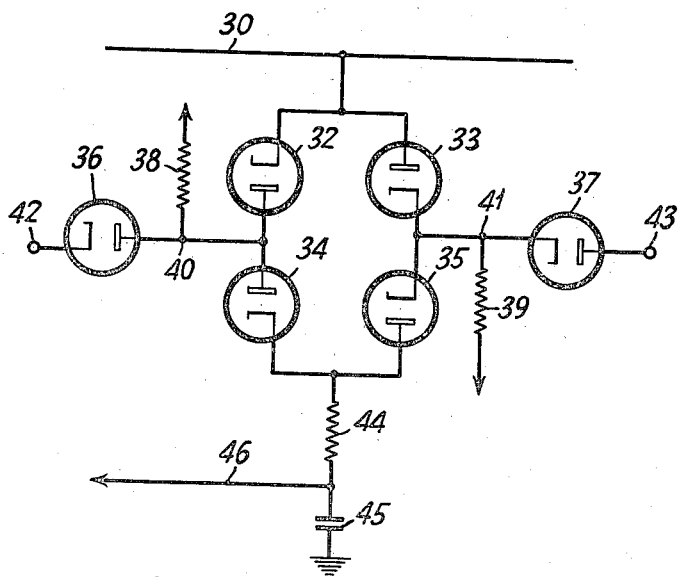
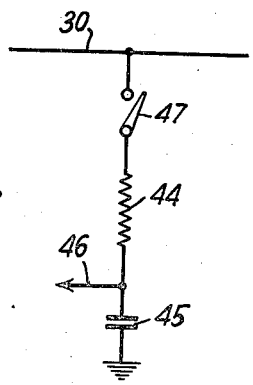
INVENTORS
ALAN DOWER BLUMLEIN, FRANK BLYTHEN
AND JOHN HARDWICK
BY H. S. Grover
ATTORNEY Jan. 5, 1943. A. D. BLUMLEIN ET AL 2,307,375
TRANSMISSION OF ELECTRICAL SIGNALS HAVING A DIRECT CURRENT COMPONENT
Filed May 23, 1939   3 Sheets-Sheet 2

INVENTORS
ALAN DOWER BLUMLEIN, FRANK BLYTHEN
AND JOHN HARDWICK
BY
ATTORNEY

INVENTORS
ALAN DOWER BLUMLEIN, FRANK BLYTHEN
AND JOHN HARDWICK
BY
ATTORNEY

Patented Jan. 5, 1943

2,307,375

UNITED STATES PATENT OFFICE 2,307,375

TRANSMISSION OF ELECTRICAL SIGNALS HAVING A DIRECT CURRENT COMPONENT

Alan Dower Blumlein, Ealing, London, Frank Blythen, Hayes, and John Hardwick, West Drayton, England, assignors to Electric & Musical Industries Limited, Hayes, Middlesex, England, a company of Great Britain Application May 23, 1939, Serial No. 275,168
In Great Britain May 30, 1938

4 Claims. (Cl. 178—7.1)

The present invention relates to the transmission of electrical signals having a direct current component.

In the specification of U. S. Patent No. 2,204,134, issued on Dec. 10, 1940, to Blumlein there is described a method by which electrical signals representative of intelligence and having recurrent datum periods are applied to an observing device which is switched into a sensitive condition during these datum periods, by means of a switching signal. The observing device develops a corrective signal which is applied to the transmission channel before or after the observation point to correct for variations of the datum level at the observation point, such as may result from the complete or partial loss of the D. C. component of said signals, the incorrect representation of the direct current component or from varying attenuation of the signals.

The circuits shown in this prior specification all depend upon the use of a rectifier which may be the observing device itself (or a rectifier associated with it) which rectifier charges a condenser during the observation of the datum portion, the charge leaking away slowly during the interval between the recurrent datum periods. The corrective signal so obtained has a saw-tooth shape due to the rapid charging of the condenser and its slow discharge. The leak resistance is necessary so as to allow the potential of the condenser to follow changes in the opposite direction to that in which it is charged by the rectifier. This leakage, however, causes the corrective potential to fall during intervals between the datum portions thus causing a variation of the level of the datum portion or of the gain of the transmission channel according to whether the correcting signal is being used to re-insert the D. C. or being used to correct for variation in gain of the channel. The leak resistance may be made of a high value to limit this fall of potential, but then difficulty will be experienced because of the slow operation of the device during discharge of the condenser. In practice a compromise is usually made. This same difficulty occurs in D. C. re-establishment by means of the diode as described in the specification of U. S. application Serial No. 720,205, now Patent No. 2,252,746, issued Aug. 19, 1941.

It is an object of the present invention to provide an improved method of correcting for variations in the effective amplitude of electrical signals representative of intelligence, such as may arise in the transmission of said signals as a result of the complete or partial loss of the D. C. component of said signals, the incorrect representation of that component, or varying attenuation of the signals, with a view to overcoming or reducing the above-mentioned difficulties.

According to the present invention in apparatus for handling complex signals having recurrent datum portions in which provision is made for correcting for varying attenuation of the signals and/or for the incorrect representation of the D. C. component as a result of the complete or partial loss of the D. C. component of said signals there is provided an observing device which is arranged to be switched into operation during the datum portions to observe the level of the datum portions, said observing device being capable of storing a charge without substantial leakage between the datum periods and being capable of changing its charge according to the value of the datum level, and said observing device is switched into the observing condition by a bi-directionally conducting switch so that it stores a charge dependent on the value of the datum level at instants when the observing device is switched into operation, the charge applied to said observing device serving as, or being used to develop, a corrective signal which is applied before or after said observing device to correct, or substantially correct, for said varying attenuation of the signals and/or for the incorrect representation of the D. C. component.

In electrical transmission circuits according to the inventon it is not in some cases feasible to employ mechanical bi-directionally conductive switches for switching the observing device into the observing condition and it is therefore necessary to employ as switches a combination of thermionic valves or other such uni-directional conductive devices arranged in such a manner that they are responsive to currents flowing in both directions, that is, either to pass a positive or negative signal.

In one arrangement according to the invention the observing device is a condenser and the condenser is not provided with any substantial leakage path, its charge being obtained through the bi-directionally conducting switch. In addition, the complex wave may represent a television signal and the datum portions may be either the black level of the picture signals or the peaks of the synchronising signal pulses or any other suitable recurrent signal, if normally of a constant amplitude.

Balancing resistances may be arranged in the switch circuit in such a manner that the effect of interference is reduced to a minimum.

If the D. C. component is present in the signal and the signal is subject to varying attenuation then corrective signals can be obtained by observing the level of the black datum portions of the television waveform. If, in addition, the D. C. component has been lost, then the D. C. component may be reinserted with reference to the peaks of, say, the synchronising signals and then a correction made for the varying levels of the black datum portions. It is also possible to correct for varying attenuation by observing the peaks of the synchronizing signals (assuming that synchronising signals correspond to an increase in carrier amplitude). In this case the peaks of the synchronising signal correspond to the recurrent datum portions. The switch may be rendered operative or inoperative by means of pulses developed from the complex wave. These pulses may be derived from the television synchronising pulses and they may also be derived by means of a delay network. Alternatively, the switching pulses can be obtained from a local pulse generator.

According to one method of carrying the invention into practice the corrective signal is developed from, or is the charge on the condenser without any appreciable smoothing, the switch and the impedance of the associated circuits from which it is fed being such as to charge the condenser sufficiently quickly to provide a substantial degree of correction during one datum period. If the corrective signal is applied before the observation point, the rate of charging the condenser is not so rapid as to cause oscillation due to the delay of transmission between the point where the correction is applied and the observation point.

In order that the said invention may be clearly understood and readily carried into effect it will now be more fully described with reference to the accompanying drawings in which Figure 1 illustrates an arrangement according to the invention.

Figure 2 illustrates a bi-directionally conducting switch such as may be used in carrying out the invention, Figure 2a is an explanatory drawing and, Figures 3, 4, 5 and 6 illustrate arrangements which may be used in carrying out the invention.

Figure 1 shows a portion of a radio receiver according to the invention which may be used for the reception of television transmissions, the arrangement embodying automatic volume control. In this figure a transformer 10 which may be the last high frequency, or intermediate frequency, transformer of the radio receiver is connected to a diode detector valve 11 which has a suitable load impedance comprising resistance 12 and condenser 13. The rectified output of this diode is passed through a suitable radio, or intermediate, frequency filter 14 to the grid of a screen grid valve 15. The cathode of valve 15 is connected to the cathode of a further valve 16, the valves 15 and 16 being arranged in push-pull and provided with a common cathode impedance 17 which is taken to source of negative potential, the two valves operating as described in the specification of U. S. Patent No. 2,185,367. In the anode circuits of these valves are provided anode resistances 20 and 21 and suitable decoupling resistances 22 and 23 and condensers 24 and 25. The condenser 18 connects the grid of valve 16 to earth the grid being also taken to a suitable potentiometer 19 which is adjusted so that the valves operate on the linear portions of their characteristics for the desired black level potential from the detector valve 11. The anode of valve 15 is D. C. coupled, as explained in the specification of U. S. Patent No. 2,120,823 via resistances 26 and 28 and condenser 27, to the grid of a cathode follower valve 29 which is provided with a suitable cathode load impedance 31.

For the purpose of describing the operation of the invention it will be assumed that the television signal has a waveform of the standard Marconi-E. M. I. type, an example of which is illustrated in the "Wireless World" dated October 4, 1935, page 373. Briefly, the wave form comprises approximately eighty-five microseconds of vision signal representing line scanning variations followed by line synchronising signals of approximately 10 microseconds duration of zero carrier amplitude followed by a black level (approximately 30 per cent modulation) datum portion of 5 microseconds duration. The frame synchronising signals comprise pulses from black level to zero of 40 microseconds duration succeeded by black level periods of 10 microseconds duration. The vision signals representing pictures comprise amplitudes in excess of the black level. The detector valve operating with this wave form will produce negative picture signals on the anode of valve 15 and thus negative picture signals are obtained on lead 30 which is connected to the output of the cathode follower valve 29. The bias applied to the leak resistance 28 connected to the grid of valve 29 is made so negative that the potential of the cathode of valve 29 is at approximately earth potential for the level corresponding to black from the detector 11. In order that this may be achieved the cathode load 31 of valve 29 is taken to a source of negative potential as is also the cathode impedance 17 of valves 15 and 16. The picture signals may be derived from terminal 9 connected to the anode of valve 16, the picture signals being positive at this point. With a D. C. transmission, such as the Marconi-E. M. I. type, the black level on the lead 30 should have a constant absolute value if the signals arriving at the receiver do not suffer varying attenuation and if the gain of the receiver and the amplifier is held constant. If, however, there is a variation of field strength at the receiver, for example, due to fading or interference from moving objects, or if the gain of the receiver and the video frequency amplifier is liable to vary, the absolute black level at lead 30 will not be constant and it becomes desirable, if constancy is desired, to apply an automatic volume control at the receiver operated by the absolute black level at 10. This may be carried out, as described in the specification of U. S. application Serial No. 69,831, by observing the black level at lead 30 and by applying a correcting signal to control the gain of the receiver. This method, as explained above, suffers from the disadvantage, that the correcting signal varies between the datum periods. In order to avoid this difficulty, an observing device of the kind shown in Figure 2 may be used.

In Figure 2 are shown six rectifier valves which operate as a bi-directionally conducting switch between lead 30 and resistance 44 which is connected to condenser 45. The arrangement is equivalent to the mechanical switch 47 illustrated in Figure 2a except, of course, that it is capable of being operated much more quickly. The three diodes 32, 34 and 36, to the left of Figure 2 have their anodes connected together at point 40 and connected to a high impedance 38 (shown as a resistance), the impedance 38, being taken to a suitable potential. Similarly, the cathodes of the three valves 33, 35 and 37 on the right hand of Figure 2 are connected together at 41 and are connected to an impedance 39. This switching device operates in the manner described in U. S. Patent No. 2,258,732. Any of the other forms of bi-directionally conducting switches described in the copending application may be used in the present invention. Push-pull control pulses are applied at terminals 42 and 43 so as to maintain for the greater part of the time these points at positive and negative potentials respectively relative to earth, thus maintaining the points 41 and 40 positive and negative respectively and thus isolating leads 30 and 46.

During the black datum period, however, the potentials on terminals 43 and 42 are made negative and positive respectively. The resistances connected to points 41 and 40 thus tend to make the potentials at points 41 and 40 negative and positive respectively, thus causing the diode valves 32, 34, 33 and 35 between lines 30 and 46 to conduct. The condenser 45 will then be charged to a potential substantially equal to that on the line 30 during black intervals. The picture signals on line 30 are negative, that is, signals representative of white are negative. An increase of the datum level representing black from detector valve 11 represents a positive increase on the grid of valve 15 and will thus cause the potential of line 30 to fall. This fall of potential will reduce the potential on condenser 45. If the lead 46 connected to condenser 45 is used as a bias control for the high frequency valves of the receiver, any tendency for an increase of signal output from the detector will be corrected to a large extent. The extent of this correction will depend on the amplitude of the signals at line 30 and the sensitivity of the controlling valves in the receiver to the control potential. For this reason the arrangement of an amplifier as shown in Figure 1 has been adopted so that comparatively large signals may be obtained at line 30. For example, if the normal amplitude of synchronising signals corresponding in amplitude to the difference between zero carrier and black level at line 30, is, say, 10 volts and the controlled valves of the receiver alter the gain of the receiver by 20 decibels for 1 volt change in the bias potential, then a change of 20 decibels in the strength of the incoming signal will cause approximately 1 volt change of signal strength in line 30 at the output of the device, that is a 10 per cent change in output for a 20 decibels change in input signal. This arrangement can be made more sensitive by increasing the effective amplitudes of the signals on line 30 or by inserting a D. C. coupled amplifier between the lead 46 and the grids of the controlled valves. It is inconvenient to provide a very large output at 30 and this difficulty may be avoided by making the amplifier stage of high gain and arranging it so that it overloads for peak white amplitudes and/or for synchronising amplitudes. The amplifier valves 15 and 16 are arranged so that they can be overloaded without grid current flowing so that such overloading does not cause an incorrect representation of black on line 30. By this means it is possible to amplify the signals, the amplitudes of which are near to black amplitudes, by an amount which if no overloading takes place might represent, say, 100 volts of synchronising signal. In this case only a 1 per cent change of output will be produced by a 20 decibel change in the strength of the input signal. In this case the exact output black level can be adjusted by adjusting the tapping on potentiometer 19 which in effect controls the absolute level at line 30 produced by a given black level from the detector valve 11. With such an overloading amplifier the output from terminal 9 cannot be used for picture signals as these will be distorted; a separate amplifier must therefore be fed from the detector in order to amplify picture signals for application to the picture reproducer.

In the arrangements described there is no leak resistance for the condenser 45 and preferably there should be no smoothing circuit in the lead 46, or if any smoothing circuit is used it should have a time constant which is much shorter than the black datum period. Some smoothing may be required in order to prevent radio, or intermediate frequency coupling between the valves, and in this case may consist of a 500 ohm series resistance with a 0.0002 microfarad shunt condenser in the lead to the grid of each control valve.

The operation of the circuit is as follows. If the black level at line 30 is incorrect, the charge on the condenser 45 will be altered as soon as the switch is operative. This alteration of charge will immediately alter the black level in such a direction as to oppose the original error of black level. As the charge builds up on the condenser 45 the black level at line 30 will approach closer to the correct value, so that the condenser 45 is never charged to a potential representative of the incorrect black level, since as soon as condenser 45 begins to take charge the black level is automatically corrected. In order to achieve this result the time constant representative of the impedance looking back into line 30, plus the resistance of the switch, plus any added resistance, such as resistance 44, should be short. If this time constant is T then the effective time constant under which the condenser will charge or discharge is approximately $T/n$, where $n$ is the ratio of the change in potential of the black level at line 30 to the change in potential on line 46 required to produce such a change. This effective time constant is preferably shorter than the datum period during which the switch is operative. The time constant, however, should not be too short since the control of black by the potential on lead 46 which is in effect controlled by the black level at 30, constitutes a feedback arrangement. The radio frequency amplifier, video frequency amplifier, the switch arrangement and any radio frequency de-coupling between line 46 and the control grids of the controlled valves will all produce a phase shift around the loop circuit, which, if there is no loss at high frequencies, may cause oscillation. The time constant should be sufficiently great to prevent such oscillation, that is, the loss due to the resistance of the switch, etc. and the condenser 45 should exceed the gain round the loop circuit for those frequencies at which a serious phase shift occurs. To prevent such oscillation a resistance 44 as shown in Figure 2 is provided, although in practice there is sufficient resistance provided by the circuits connected to line 30, plus the resistance of the switch, to provide this and the condenser 45 can be adjusted to obtain the necessary time constant. The condenser 45 should be made sufficiently large to prevent undue leakage of its charge due to the inevitable irreducible leakage on the lead 46. Such leakage would cause a fall in the effective black level between datum periods. Care must also be taken that there is no undue inductance associated with the connections to condenser 45, that is, in the leads between condenser 45 and resistance 44 and between condenser 45 and earth, or otherwise such inductance may cause the effective impedance of condenser 45 to rise at very high frequencies thus permitting oscillations around the loop circuit.

A suitable circuit for producing switching pulses for application to terminals 42 and 43 is shown in Figure 3. The operation of this pulse generator circuit is similar to that described in U. S. Patent 2,258,732. Rectified television signals with synchronising pulses positive and vision signals negative are applied at terminal 48 and the synchronising signals are separated from the vision signals in valve 51 and appear as negative pulses on the anode of this valve. Suitable signals for application at terminal 48, may for example, be obtained from the anode of valve 15 or from a separate amplifier driven by the rectifier valve 11. The operation of the separating valve 51 is described in patent specification of U. S. Patent No. 2,252,746. The negative synchronising signals produced across the resistance 52 in the anode circuit of valve 51 are applied via condenser 53 to a delay network comprising shunt condensers and series inductances and providing a delay in the present instance of 4.5 micro-seconds. Signals from the input side of the delay work are passed through a suitable coupling condenser 55 and grid resistance 56 to the grid of valve 57 and similarly signals from the output end of the delay network, which is suitably terminated by resistance 54, are passed through a suitable coupling condenser 59 and resistance 60 to the grid of valve 58. Valves 57 and 58 are provided with a common cathode impedance 64. The grids of valves 57 and 58 are normally biased so that in the absence of signals valve 57 is insulating and valve 58 conducting. The anodes of these valves are connected through suitable biasing arrangements, shown here as batteries 67 and 68, to the terminals 69 and 70 which may be connected to the terminals 43 and 42 of Figure 2. The bias potentials for the grids of these valves are obtained from a suitable potentiometer 61 and are suitably decoupled by condensers 62 and 63. It will be observed that in the absence of any synchronising pulses from valve 51 the bias normally applied to these valves is such as to maintain terminal 69 positive and terminal 70 negative as required to maintain the switch of Figure 2 inoperative. A synchronising pulse applied to valve 51 arrives at valve 57 and makes its grid still more negative thereby leaving valve 57 inoperative. The synchronising pulse then arrives at valve 58 and makes its grid more negative by an equal amount, but owing to the initial negative bias on valve 57 this amount is insufficient to cause valve 58 to become non-conductive. At the end of the synchronising pulse, however, valve 57 returns to its normal amount of negative bias, whereas owing to the delay network, valve 58 is still maintained more negative than normally. If the synchronising pulse is of sufficient amplitude (and sufficient pulse amplitude must be available for this circuit to operate satisfactorily), the grid of valve 58 will now be more negative than the grid of valve 57. Therefore valve 57 will conduct and valve 58 will insulate, thus producing the requisite change-over at terminals 69 and 70 and thereby making the switch of Figure 2 conducting. In 4.5 micro-seconds after this, however, the end of the synchronising pulse will arrive on the grid of valve 58 which will therefore become positive again and cause valve 58 to conduct and valve 57 to insulate thus re-establishing the original potential conditions on terminals 43 and 42. It will be seen therefore that the arrangement of Figure 3 serves to produce push-pull pulses at 69 and 70 which pulses follow immediately after the synchronising pulses and are of 4.5 micro-seconds duration. An examination of the Marconi-E. M. I. waveform will show that such a pulse is adequate to turn on the switch during the black periods following both line and frame synchronising pulses. If desired the connection from the delay network to the grid of valve 57 may be taken from a point 0.5 microsecond from the beginning of the delay network so as to ensure that the switch is not operated before black level is truly obtained on lead 30. The slight delay (due to inevitable small reactances) in the switching circuit usually provides the necessary tolerance. With a system employing zero carrier synchronising pulses, however high the gain of the amplifier is made, unless it overloads on its own surface noise, that is, the noise due to random fluctuations in the receiver, or local interference, the synchronising pulses cannot be reduced in amplitude by overloading so that when the amplifier is switched on the synchronising pulses will, unless the maximum gain of the receiver is very high, reach the input terminal 48 of valve 51 and will therefore operate the automatic volume control. Overloading of the radio receiver or of the amplifier comprising valves 15 and 16 may reduce the black level but will produce an effective level at line 30 more negative than is required, therefore setting the automatic volume control into operation.

The arrangements described above all refer to an automatic volume control circuit wherein the correcting signal operates before the point of observation. The corrective signal can alternatively be applied after the point of observation, although correction after observation by itself is not satisfactory for automatic volume control when it is necessary to deal with large changes of input signals. Additional control may, however, be applied with advantage after the observation point. It has already been mentioned in the first example that a change in input strength of 20 decibels altered the output level on line 30 by 1 volt; if, in addition, the signal across condenser 45 is applied to control the gain of an amplifier following line 30 so that a potential change of 1 volt on condenser 45 produces a 10 per cent change in the gain of the following amplifier, then there will be practically no change in the output when the input signal changes. Alternatively, the transformer 10 may be fed from a special automatic volume control amplifier which has final stages separate from those used to operate the main picture rectifier. Such an amplifier is convenient because a large output can be obtained from the rectifier for black level, any limiting of picture being of no interest at this point. The control signal is used to control the gain of amplifier stages common to both the main picture amplifier and the automatic volume control amplifier feeding transformer 10. The control signal may also control an amplifier stage on the main picture amplifier after the branch to the automatic volume control amplifier. Such a control could be adjusted to maintain black level at the main picture rectifier very constant indeed, as changes of black level in the automatic volume control amplifier necessary to operate the automatic volume control could be compensated. Such a control would be a control after the point of observation, since the observation point is the point at which the automatic volume control amplifier divides from the main picture amplifier.

Figure 4:
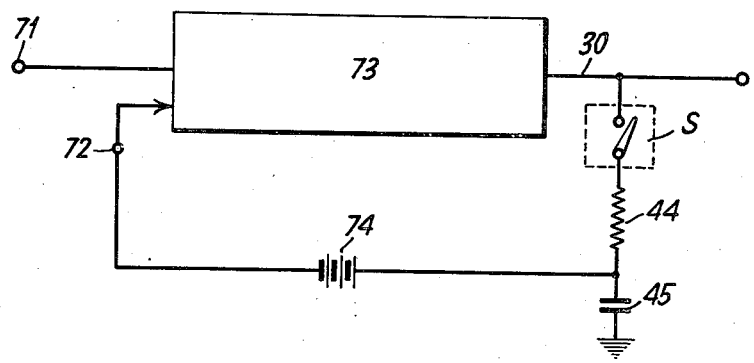

Figure 4 shows an arrangement for re-establishing D. C., or for correcting for D. C. errors due to incorrect incoming D. C. levels or for varying D. C. levels in the amplifier 73 which represents a direct current amplifier having two input terminals 71 and 72 which are independent and add in the amplifier. Thus, for example, the amplifier input may comprise two valves having their anodes connected in parallel and connected to a common load impedance. This amplifier 73 is arranged to give a phase reversal between the output lead 30 and the input lead terminal 72. At the output lead 30 there is arranged a switch s, which may be of a form shown in Figure 2, which is arranged to charge or discharge condenser 45 through resistance 44. The switch s is closed during the datum periods, for example, during black level datum periods, or during the synchronising signal period, by an arrangement such as is shown in Figure 3. This arrangement charges condenser 45 to the datum value. Suppose for example, that the required level of the datum at line 30 is plus 50 volts and the average bias at terminal 72 to produce this datum is minus 2 volts, then a battery 74 of 52 volts is inserted between condenser 45 and terminal 72 with the positive terminal of the battery connected to condenser 45. Any incorrect level at line 30 will, due to the phase reversal in the amplifier tend to feed back such a voltage into terminal 72 as to correct with only a small error at line 30. The exact datum level on line 30 can conveniently be altered by changing the voltage of the battery 74. Suppose that the datum period is 5 microseconds long and that the switch s is closed for 4 micro-seconds during the 5 micro-seconds period and that the gain of the amplifier 73 between terminal 72 and output 30 and between terminals 71 and 30 is minus 30. Assume also that for input biases of minus 2 volts applied to both terminals 71 and 72 the output is designed to be plus 50 volts on line 30. The following equation may be written for conditions when the switch s closed for some time:

$$(V-50) = -30\{(v_1+2) + (v_2+2)\}$$

where
V is the voltage at 30
$v_1$ is the voltage at 71
$v_2$ is the voltage at 72
But
$$v_2 = V - 52$$
$$(V-50) = -30\{(v_1+2) + (V-52+2)\}$$
$$31(V-50) = -30(v_1+2)$$
$$V = 50 - {}^{30}\!/_{31}\{v_1+2\}$$

Suppose now that the input datum is incorrect by one volt, or that the biases or valve currents, etc. in amplifier 73 alter to tend to give an output change which corresponds to change of $v_1$ of 1 volt, then V will change by $-{}^{30}\!/_{31}$ volt in place of the $-30$ volts which it would have changed had the feedback path not been effective. If more perfect correction is required, or if the amplifier 73 has only a small gain a D. C. coupled amplifier (with suitably biased connections) may be inserted between condenser 45 and input 72.

Similarly it can be shown that the time constant effective for charging condenser 45 through resistance 44 is $\frac{1}{30}$ of the RC value of condenser 45 and resistance 44. Suitable values might here be 0.03 microfarad and 1000 ohms. The product of the resistance and capacity would then be 30 microseconds which would be effective as 1 microsecond for the rate of charging of condenser 45 to its final value. During the four microseconds period condenser 45 would charge to within 2 per cent of the value which it would have if the switch were closed for a long time. With 1000 ohms and 0.03 microfarad there would be a 30:1 loss of amplitude between output line 30 and input 72 at a frequency of 0.16 mc./s., at which the amplifier 73 (for television) would reasonably not give appreciable phase shift, so that oscillation is not to be expected. If the phase shift is very small condenser 45 can be reduced giving a more perfect correction. If oscillation trouble is experienced condenser 45 can be increased at the expense of rapid correction. The resistance 44 may be totally contained within the switch, and the output impedance of amplifier 73.

If the device of Figure 4 is to operate on the synchronising signal amplitude and not on the black level the arrangement of Figure 3 may be modified. As before positive synchronising signals from any suitable point are fed in to the input terminal 48 of valve 51. The delay of the network is made slightly shorter than the duration of the synchronising pulses. The lead to the grid of valve 58 is taken from just after the beginning of the delay network, and the grid lead of valve 57 is tapped on the delay network at the end (instead of at the end and the beginning as shown). The synchronising pulse, slightly delayed, then arrives at valve 58 first, insulates this valve and reverses the potentials on branches 69 and 70. The synchronising pulse finally arrives at valve 57 and insulates this valve, thus re-establishing the original potentials on terminals 69 and 70. Thus, the pulses on terminals 69 and 70 are effective to operate the switch only during synchronising pulses.

If the amplifier 73 forms part of an equipment where suitable pulse generating sources are available, for example, in television scanning equipments, the pulses for operating the switch may be applied quite separately from the signals arriving at terminal 71 instead of being generated therefrom as described with reference to Figure 3.

When the arrangement of Figure 4 is used to re-establish D. C. the separate input terminal 72 may be dispensed with and the terminal 72 can be connected to the lower end of a leak resistance connected to terminal 71. The condenser coupled to terminal 71 should be of lower capacity than condenser 45 which will in general necessitate increasing the capacity of condenser 45. Rapid operation can no longer be obtained since an additional time constant in the form of the leak and condenser has been introduced into the circuit of terminal 71.

Figure 5:
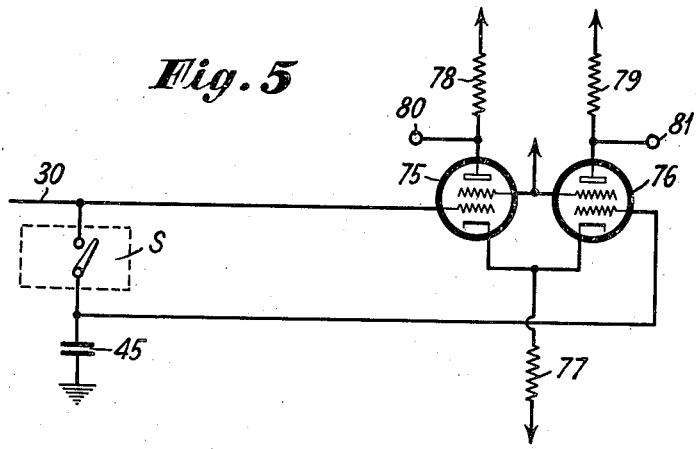

Figure 5 shows an arrangement for D. C. re-insertion or correction wherein the corrected signal is added after the point of observation. The push-pull valves 75 and 76 have a high common cathode resistance 77 which is taken to a source of negative potential. This, as described in the specification of U. S. Patent No. 2,185,367, virtually forces the valves to operate in push-pull. The incoming signal at line 30 is observed by the switch s and condenser 45 and the observation datum potential is applied to the grid of valve 76 which is positively phased to that connected to line 30. Any positive wander of the potential of line 30 will give a positive charge to condenser 45 which will make the grid of valve 76 positive, thus neutralising for push-pull the wander on line 30. The output may be taken from terminal 80 or from terminal 81, or from both in push-pull.

The arrangement of Figure 5 may be combined with that of Figure 4 so that the "after observation" correction of Figure 5 corrects any small errors left by the arrangement of Figure 4. Condenser 45, switch s and lead 30 are common to the two arrangements. The arrangement of Figure 5 must have the resistance 44 added if required by the circuit of Figure 4 in order to prevent oscillations.

Figure 6:
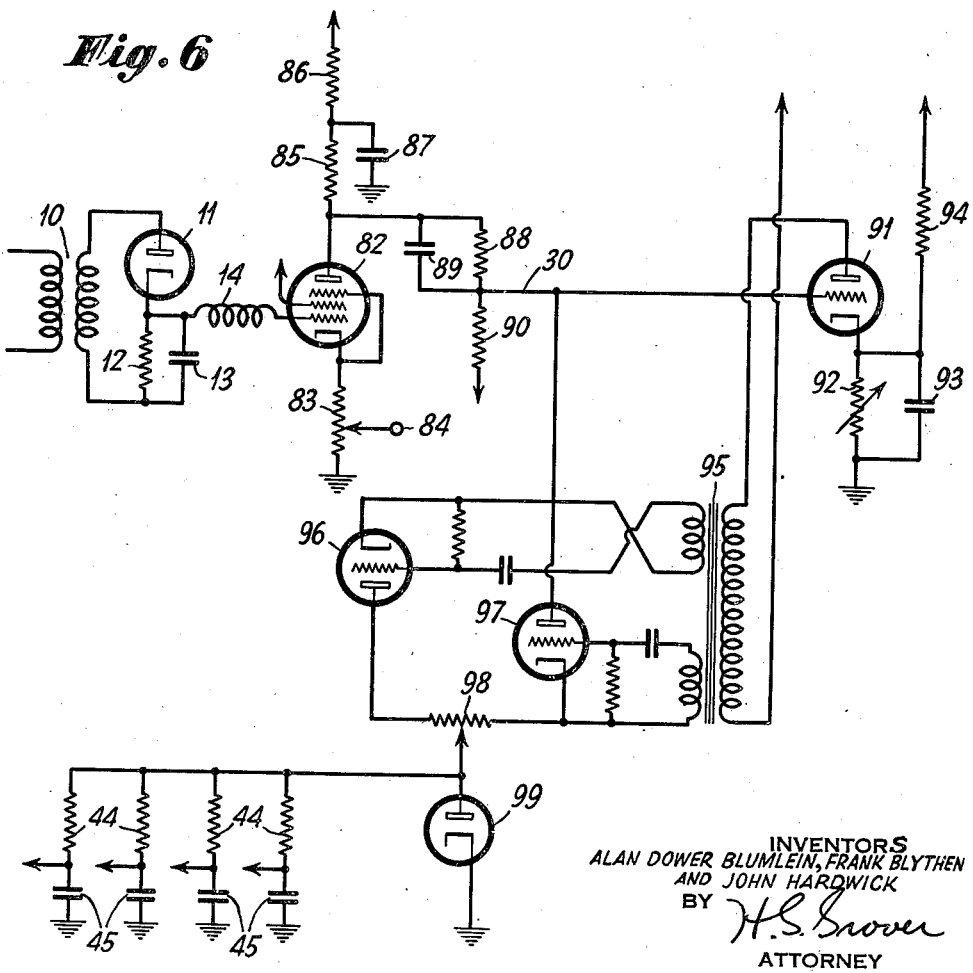

An example of a television receiver having a different form of switch from that shown in Figure 2 is illustrated in Figure 6. The form of switch to be described forms the subject of U. S. patent application Ser. No. 276,234, filed May 27, 1939. The transformer 10 supplies the diode rectifier valve 11 and a load impedance comprising resistance 12 and condenser 13 with high frequency signals, the rectified signals across the load impedance being transferred to the grid of valve 82 which has a potentiometer 83 in its cathode circuit feeding picture signals out at terminal 84. The resistance 85 constitutes in conjunction with decoupling condenser 87 and resistance 86, the anode load of valve 82, the resistances 88 and 90 and condenser 89 forming the coupling circuit to valve 91. The anode of valve 82 is thus D. C. coupled to the lead 30 on which the picture signals are negative, and an increase of incoming signal strength to the receiver giving an increased negative black datum level on line 30, assuming that the Marconi—E. M. I. waveform is used. Synchronising signals which are positive at 30 are separated from the picture signals by triode valve 91, the cathode potential of which is adjusted by varying the resistance 92 which is a portion of a bias potentiometer 92, 94 and is shunted by decoupling condenser 93. The observation switch consists of two triode valves 96 and 97 connected back to back, the grids of the valves being connected via suitable grid leaks and condensers to separate secondary windings on the transformer 95. These triodes are switched on by pulses from the transformer 95 through the primary of which the synchronising pulses flow, the primary winding being connected to a suitable positive potential. The primary inductance of the transformer 95 is made low in value so that the beginning of a synchronising pulse gives a negative pulse which dies away and the end of the synchronising pulse gives a positive pulse to the triodes, which pulse occurs during the black datum level, in other words, the synchronising pulse is differentiated by the transformer 95. The positive pulses applied to the grids of the triode valves 96 and 97 causes them to conduct and also charges their grid condensers due to grid current, thus providing negative bias which effectively causes the triode valve to insulate during the remainder of the line period. The triode valves when conducting charge or discharge the condensers 45 through the resistances 44 in accordance with the signal black level on line 30. Leads from the junctions of condensers 45 and resistances 44 are taken to the control grids of the valves in the radio frequency amplifier and thus provide automatic volume control. By dividing condenser 45 and resistance 44 into a number of parallel branches, de-coupling for radio or intermediate frequencies is obtained between the stages of the receiver. The diode valve 99 connected across the automatic volume control line prevents the automatic volume control bias becoming more positive than zero when no signal is being received, thus stopping the controlled valves from passing grid current which might so lower the receiver gain as to prevent the device from operating when a signal is received.

In Figure 6 there is shown a resistance 98 with an adjustable tapping. This resistance is used to adjust the relative resistance of the two directions of current flow through the switch. Under conditions of reception suffering from interference, the presence of interference peaks on the black datum level can seriously interfere with the automatic volume control and cause the interference to be very severe due to black or white streaks caused by false changes of amplifier bias.

The interference peaks extend positively and negatively from the black level and are usually of very short duration. By adjusting the tapping on the resistance 98 a balance can be struck between the effects of the positive and negative peaks of interference so that the best possible automatic volume control can be obtained in the presence of interference. Instead of a potentiometer as shown, two separate adjustable resistances may be used so that not only the ratio of the two paths of resistance 98 but also its total value can be varied. A similar arrangement may be applied to the switch of Figure 2, for example, by introducing fixed preset or adjustable resistances between the resistance 44 and the diodes connected thereto, or between the lead 30 and the diodes which are connected to lead 30. The introduction of these balancing resistances to the conductive directions of a switch so that the apparatus may be adjustable for the best operation under conditions of interference, constitutes a feature of this invention.

In U. S. patent to Blumlein No. 2,244,240, issued on June 3, 1941, there is described a method of D. C. re-insertion employing negative feedback in a D. C. coupled amplifier in which use is made of the "blacked out" signal produced by a cathode ray transmitting tube of the mosaic type during the blacked out period as a datum level. In Figure 10 of that application is shown a three-diode switching arrangement for charging a condenser 22, which is discharged by a leak resistance 23. The bi-directionally conductive switching system may with advantage be applied according to the present invention to the co-pending arrangement with the omission of the leak resistance 23, and the addition of a two way conducting switch of say, one of the types described, in which case the corrective signal fed back to the input of the D. C. coupled amplifier does not vary between the datum periods.

We claim:

1. In a television device apparatus for reinserting the direct current component in a signal from which the component is lacking or is diminished and wherein said signal attains recurring datum levels comprising means for developing switching pulses at recurring intervals, bi-directional switching means operable by said switching pulses, means actuated by said bi-directional switching means to develop a corrective signal proportional to the value of said signal attaining recurring datum levels, electrical energy storage means for storing said corrective signal, said storage means maintaining said stored energy substantially constant during intervals between said recurring datum signals and means for utilizing said stored energy to correct for loss or diminution of said direct current component.

2. Apparatus in accordance with claim 1, wherein said bi-directional switching means comprises a plurality of diodes connected substantially in parallel.

3. Apparatus in accordance with claim 1, wherein said switching arrangement comprises a first pair of diodes having the anodes thereof connected directly each to the other and a second pair of diodes having the cathodes thereof connected directly each to the other, both of said pairs of diodes being connected in parallel with the cathodes of one pair connected to the anodes of the other pair.

4. Apparatus in accordance with claim 1, wherein the means for developing the switching pulses at recurring intervals comprises a thermionic tube circuit for separating a portion of the signals from the other portions thereof, and means for developing push-pull switching pulses from said separated section of said signal.

ALAN DOWER BLUMLEIN.
FRANK BLYTHEN.
JOHN HARDWICK.